United States Patent
Schmitt et al.

(10) Patent No.: US 10,736,723 B2
(45) Date of Patent: Aug. 11, 2020

(54) STRAW FOR THE PRESERVATION OF A PREDETERMINED DOSE OF LIQUID-BASED SUBSTANCE

(71) Applicant: IMV TECHNOLOGIES, Saint Ouen sur Iton (FR)

(72) Inventors: Eric Schmitt, Villaines-la-Juhel (FR); Jean-Charles Gorges, Chenay (FR)

(73) Assignee: IMV TECHNOLOGIES, Saint Ouen sur Iton (FR)

(*) Notice: Subject to any disclaimer, the term of this patent is extended or adjusted under 35 U.S.C. 154(b) by 142 days.

(21) Appl. No.: 15/567,626

(22) PCT Filed: Apr. 19, 2016

(86) PCT No.: PCT/FR2016/050905
§ 371 (c)(1),
(2) Date: Oct. 19, 2017

(87) PCT Pub. No.: WO2016/170263
PCT Pub. Date: Oct. 27, 2016

(65) Prior Publication Data
US 2018/0092723 A1   Apr. 5, 2018

(30) Foreign Application Priority Data
Apr. 20, 2015   (FR) ...................... 15 53536

(51) Int. Cl.
*A61D 19/02*   (2006.01)
*G01K 11/12*   (2006.01)

(52) U.S. Cl.
CPC ......... *A61D 19/024* (2013.01); *A61D 19/025* (2013.01); *G01K 11/12* (2013.01)

(58) Field of Classification Search
CPC ..... A61D 19/024; A61D 19/025; G01K 11/12
See application file for complete search history.

(56) References Cited

U.S. PATENT DOCUMENTS

| | | | |
|---|---|---|---|
| 4,134,359 A | 1/1979 | Redpath | |
| 4,826,550 A | 5/1989 | Shimizu et al. | |
| 7,056,727 B2 | 6/2006 | Saint-Ramon et al. | |
| 7,252,988 B2 | 8/2007 | Saint-Ramon et al. | |
| 2009/0306674 A1* | 12/2009 | Chandler | A61B 17/8802 606/93 |
| 2011/0121094 A1 | 5/2011 | Burney | |

(Continued)

FOREIGN PATENT DOCUMENTS

| | | |
|---|---|---|
| EP | 0873726 A1 | 10/1998 |
| FR | 995878 A | 12/1951 |

(Continued)

*Primary Examiner* — Michael L Hobbs
(74) *Attorney, Agent, or Firm* — Browdy and Neimark, P.L.L.C.

(57) ABSTRACT

The straw includes a tube (11) extending between a first end (16) and a second end (17) and includes a gas-permeable but liquid-impermeable plug (12). The tube (11) is made of a thermochromic material that reversibly changes colour at a pre-set temperature threshold, by virtue of which colour change the tube (11) has a first visual appearance if the temperature thereof is below the preset threshold and a second visual appearance that is different from the first visual appearance if the temperature thereof is above the preset threshold.

15 Claims, 2 Drawing Sheets

(56) References Cited

U.S. PATENT DOCUMENTS

2014/0221528 A1\* 8/2014 Ribi ........................ A47G 19/00
                                                                                       523/351
2016/0278905 A1\* 9/2016 Schmitt ................ A61D 19/024
2017/0356172 A1\* 12/2017 Searcy ................. B05B 1/3093

FOREIGN PATENT DOCUMENTS

| FR | 2824255 A1 | 11/2002 | | |
| --- | --- | --- | --- | --- |
| FR | 2824256 A1 | 11/2002 | | |
| FR | 3011732 A1 \* | 4/2015 | ........... | A61D 19/024 |
| FR | 3011732 B1 | 9/2016 | | |
| GB | 669265 A | 4/1952 | | |
| GB | 2422657 A1 | 8/2006 | | |
| WO | 2010060813 A1 | 6/2010 | | |
| WO | 2010070533 A1 | 6/2010 | | |

\* cited by examiner

STRAW FOR THE PRESERVATION OF A PREDETERMINED DOSE OF LIQUID-BASED SUBSTANCE

BACKGROUND OF THE INVENTION

The invention generally relates to the preservation of a predetermined dose of liquid-based substance, in particular pure or diluted animal semen; and more particularly to the straws for performing such preservation.

It is known that such a straw comprises a tube and a stopper disposed in the tube. The stopper is usually of the three-part type originally described in French patent 995.878, corresponding to British patent 669,265, i.e. formed by two plugs made from a fibrous substance enclosing a powder which, on contact with a liquid, transforms into an impermeable paste or gel adhering to the wall of the tube so that the stopper is liquid-tight.

Similar but improved stoppers are described by the French patent applications 2 824 255 and 2 824 256.

Stoppers of another type are also known, for example a stopper made from a single-piece cylinder of hydrophobic microporous material described by European patent application 0 873 726 or a stopper made from a single-piece cylinder of sintered self-sealing microporous material as described by PCT application WO 2010/070533.

In the initial state, the stopper is disposed in the neighborhood of one of the ends of the tube and it is provided that in the filled state, the dose of liquid substance which must be preserved in the straw is disposed between the stopper and the other end of the tube (the end furthest from the stopper).

To fill the straw, the end closest to the stopper is placed in communication with a vacuum source while the furthest end of the tube is placed in communication with a vessel containing the substance to be introduced into the straw.

The air initially contained between the stopper and the furthest end of the tube is sucked through the stopper while the substance moves forward into the tube until it meets the stopper.

If necessary, after filling, the straw is welded close to one or both of its ends and is stored cold.

In order to empty the straw, if necessary after cutting the welded end portions and thawing, a rod is inserted into the tube via the end closest to the stopper, until it bears against the stopper. Using this rod, the plug is made to slide in the manner of a piston towards the end furthest from the stopper, which causes the expulsion of the dose of substance which had been introduced into the straw.

When the straw is used to preserve diluted animal semen, in particular bovine semen, emptying of the straw is carried out to perform an artificial insemination.

SUMMARY OF THE INVENTION

The invention aims to provide such a straw which provides the operators with new capabilities while remaining simple, convenient and economic to manufacture and use.

To that end the invention provides a straw for the preservation of a predetermined dose of liquid-based substance, comprising a tube extending between a first end and a second end and comprising a liquid-tight, gas-permeable stopper, which stopper being disposed in the tube close to its first end and extending between a first end turned towards the first end of the tube and a second end turned towards the second end of the tube, said stopper and said tube being configured so that after the liquid-based substance has come to meet the stopper by its second end, the stopper blocks the passage of the liquid-based substance and, by pushing on its first end, can be slid in the tube towards the second end of the tube, characterized in that said tube is of thermochromic material having a reversible change in hue at a predetermined temperature threshold, whereby the tube has a first visual appearance if its temperature is below said predetermined threshold and a second visual appearance different from the first visual appearance if its temperature is above said predetermined threshold.

The material of the straw tube thus plays the role of a temperature indicator component.

Such a component enables the operator, when the straw is filled, to visually check whether the dose of substance contained in the straw is at a target temperature, for example above 35° C. or 37° C. when an artificial insemination is required to be made.

The invention is based on the observation that in principle, given the small wall thickness of the tube of a straw, the temperature of the part of the tube that surrounds the substance matches that of the substance and thus has the first visual appearance when the temperature of the substance is below the predetermined threshold and the second visual appearance when the temperature of the substance is above the predetermined threshold.

The fact that the temperature indicator component is formed by the tube makes it possible to check the temperature over the whole length of the tube. In particular, if part of the dose of substance contained in the tube over part of its length is below the predetermined threshold and another part of the dose of substance contained in the tube over another part of its length is above that threshold, the difference in appearance of the tube over the two parts concerned will enable the operator to know that this difference exists.

The reversible character of the hue change of the thermochromic material with which the tube is formed enables monitoring of the temperature of the substance contained in the straw. For example, if the substance has had the time to cool between the warming operation and the time at which the operator prepares to perform an artificial insemination, to the extent of being below the predetermined threshold, the appearance of the straw tube will enable the operator to know that the substance has thus cooled.

It is to be noted that it is advantageous for the role of the temperature indicator component to be played by the material of the tube rather than by a component added onto the material of the tube such as a coating or a label.

This makes it possible to faithfully reflect the temperature of the substance by virtue of the direct contact between the thermochromic material and the substance while avoiding the risks which such a direct contact could pose on account of friction between the stopper and the tube which occurs on manufacture (insertion of the stopper into the tube) or at the time of expelling the dose of substance (sliding the stopper along a large portion of the length of the tube).

This also makes it possible to be able to manufacture the straw much more simply and economically than if it had been necessary to add onto the inside surface of the tube, over its whole length, a separate temperature indicator component.

The manufacture of the straw tube may for example be carried out conventionally by extrusion of a plastic material that is conventional apart from the fact that an additive is added to it to make it thermochromic with the aforementioned hue change.

According to advantageous features, said tube is transparent or translucent when it has the first appearance and when it has the second appearance, the stopper being visible through the tube.

The visible character of the stopper through the straw tube, both below and above the predetermined threshold, enables the integrity of the straw to be checked, in particular on manufacture (it is possible to verify that the stopper has been correctly inserted into the tube), on filling (it is possible to verify that the dose of substance has actually reached the stopper) and after an artificial insemination (it is possible to verify that the stopper has actually reached the second end of the tube and that the substance has thus been correctly expelled).

According to other advantageous features, the tube has an inside surface having a smooth surface state.

The smooth surface state (that is to say not being granular) of the straw tube on the inside makes it possible to provide good preservation of the liquid-based substance, in particular excellent viability of spermatozoa when the substance is diluted animal semen, as well as fluid-tightness between the tube and the stopper at the time of its sliding to expel the dose of substance.

According to other advantageous features:
said predetermined threshold is 35° C. to 37° C. in the direction of temperature increase;
said predetermined threshold is 32° C. to 34° C. in the direction of temperature reduction;
the tube has a blue hue in the first appearance and is colorless in the second appearance;
the material of the tube comprises microcapsules having a shell enclosing a thermochromic solution;
said shell of the microcapsules is of polyurea or polyurethane;
said shell of the microcapsules results from the reaction of an aromatic polyisocyanate;
said thermochromic solution comprises methyl stearate as solvent;
in said microcapsules the proportion by weight of the shell is comprised between 20% and 40%, preferably 25%;
the proportion by weight of said microcapsules in the material of the tube is comprised between 1.5% and 10%, preferably 2.5%;
the material of the tube comprises a PVC base; and/or
said stopper is formed by two plugs made from a fibrous substance enclosing a sealing agent formed by a powder transforming on contact with said substance into an impermeable paste or gel adhering to the wall of the tube so that the stopper is liquid-tight, said powder comprising the powder of a salt that is not a fluorophore in the dry state and is a fluorophore when it is dissolved in water.

DESCRIPTION OF THE DRAWINGS

The disclosure of the invention will now be continued with the description of embodiments given below, for the purposes of illustration and non-limitatively, with reference to the attached drawings in which.

DETAILED DESCRIPTION

Figure 1:
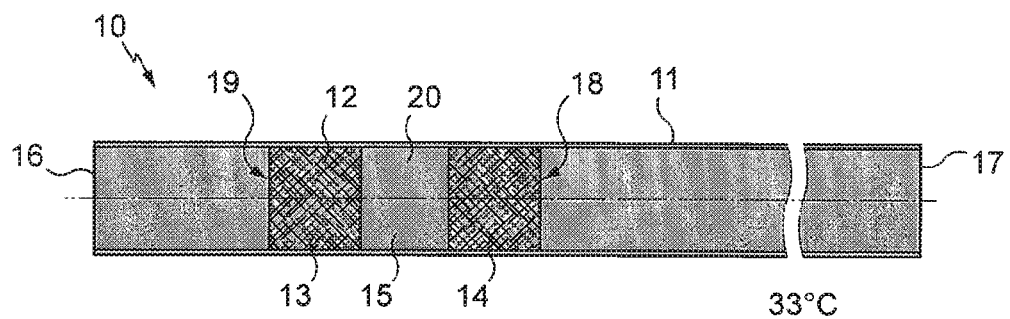
FIG. 1 is a diagrammatic view of a straw according to the invention, in the empty state and at a temperature of 33° C.

The straw 10 illustrated in FIG. 1 comprises a tube 11 and a stopper 12.

The tube 11 is made from extruded thermochromic plastic material, with an inside diameter for example of 1.6 or 2.5 mm and a length of the order of 133 mm.

The stopper 12 is of the three-part type, i.e. formed by two plugs 13 and 14 made from a fibrous substance enclosing a sealing agent 20 formed by a powder 15 (FIG. 1) which, on contact with a liquid, is capable of transforming into an impermeable paste or gel 15' (FIG. 2) adhering to the wall of the tube 11 so that the stopper 12 is liquid-tight.

In the initial state, shown in FIG. 1, the stopper 12 is disposed in the neighborhood of the end 16 of the tube 11 and it is provided that in the filled state, the dose of liquid-based substance which must be preserved in the straw is disposed between the stopper 12 and the end 17 of the tube 11 that is the furthest from the stopper 12.

In order to fill the straw 10, the end 16 is placed in communication with a vacuum source while the end 17 is placed in communication with a vessel containing the substance to be introduced into the straw.

Figure 2:
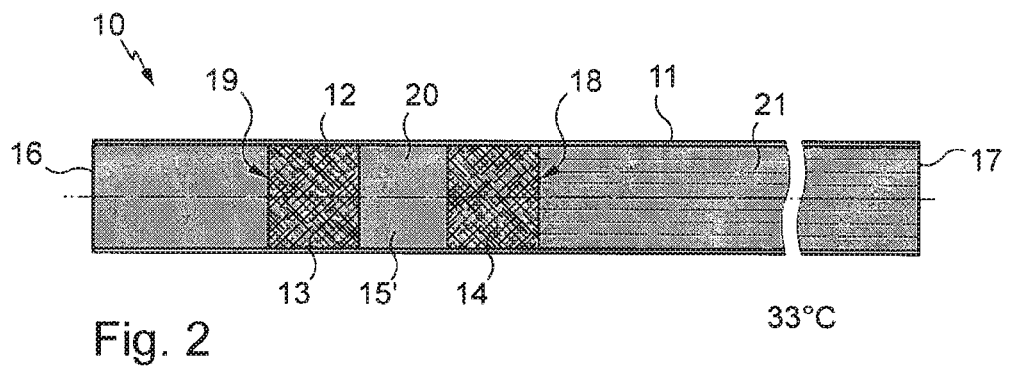
FIG. 2 is a view similar to FIG. 1 but showing the straw in the filled state.

The air initially contained between the stopper 12 and the end 17 is sucked through the stopper 12 while the substance 21 (FIG. 2) moves forward in the tube 11 until it encounters the stopper 12, by the end 18 thereof that faces towards the end 17 of the tube 11, that is to say the end of the stopper 12 that can be seen on the right in FIGS. 1 and 2.

The straw 10 is then in the filled state shown in FIG. 2.

If necessary, after filling, the straw is welded in the neighborhood of one or both of its ends 16 and 17 and is placed in cold storage.

To empty the straw 10, if necessary after cutting the welded end portions and thawing, there is inserted into the tube 11 a rod which comes to bear on the end 19 of the stopper 12 (which end is situated on the opposite side to the end 18).

Using this rod, the stopper 12 is made to slide in the manner of a piston towards the end 17 or the end which corresponds after cutting the welded portion, which causes the expulsion of the dose of substance 21 which had been introduced into the straw.

Figure 3:
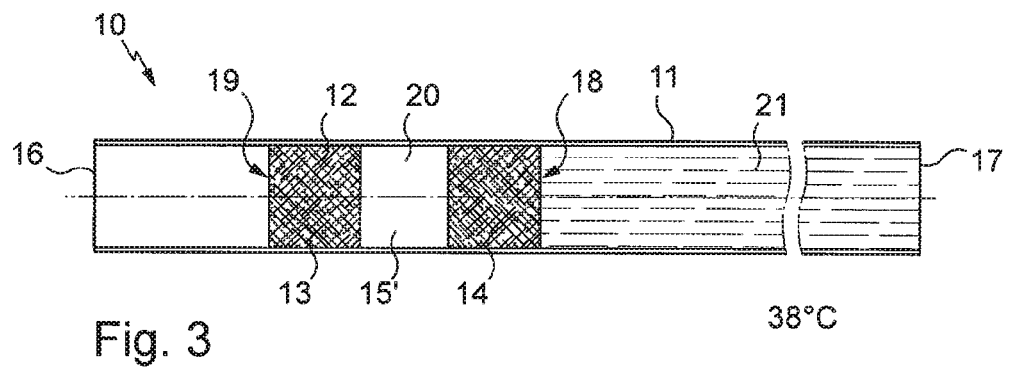
FIGS. 3 and 4 are similar views respectively to FIG. 2 and to FIG. 1 but at a temperature of 38° C.

It will be noted, in comparing FIGS. 2 and 3 (or FIGS. 1 and 4), that the visual appearance of the tube 11 of straw 10 is different at the temperature of 33° C. (FIGS. 1 and 2) and at the temperature of 38° C. (FIGS. 3 and 4).

Figure 4:
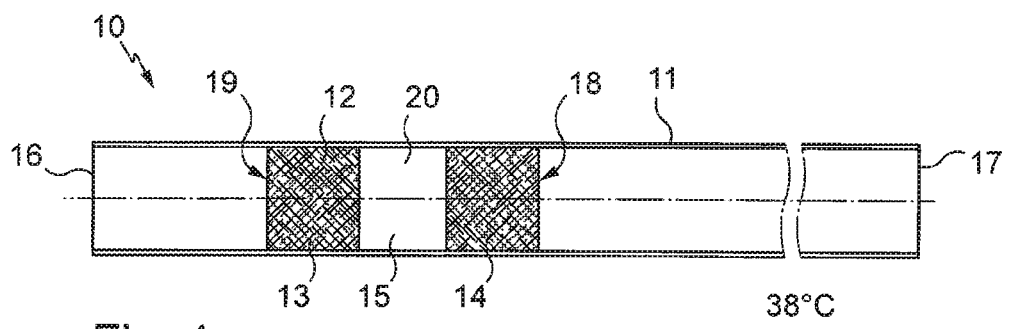
Figure 5:
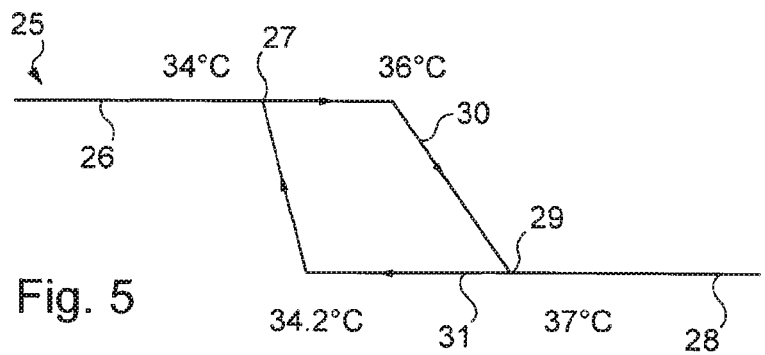
FIG. 5 is a graph illustrating the hue change of the thermochromic material from which the straw tube is made.

This change, between the first visual appearance illustrated in FIGS. 1 and 2 and the second visual appearance illustrated in FIGS. 3 and 4, which is different from the first visual appearance, comes from the fact that the tube 11 is of thermochromic material having a hue change at a predetermined temperature threshold.

Here, the thermochromic material of the tube 11 has a blue hue when its temperature is below the hue change threshold and a colorless or practically colorless hue when its temperature is above the hue change threshold.

In FIG. 4, in which the temperatures are along the abscissa axis and the hues along the ordinate axis, the curve 25 illustrates the hue change of the thermochromic material from which the tube tube 11 is made.

As shown by the portion 26 of the curve 25 which can be seen to the left of the point 27, so long as the temperature is less than 34° C., the tube 11 maintains the same hue (first visual appearance), i.e. a blue hue.

As shown by the portion 28 of the curve 25 which can be seen to the right of the point 29, so long as the temperature is greater than 37° C., the tube 11 maintains the same hue (second visual appearance), i.e. a colorless or practically colorless hue.

The portion 30 of the curve 25, situated between the point 27 and the point 29, shows the hue of the tube 11 when its temperature increases between 34° C. (point 27) and 37° C. (point 29). This direction of temperature increase is symbolized by the arrows which the portion 30 comprises. It can be seen that up to 36° C. the tube 11 maintains its blue hue (first visual appearance) and that the hue of the tube 11 changes progressively from blue (first visual appearance) to colorless or practically colorless (second visual appearance) between 36° C. and 37° C.

The portion 31 of the curve 25, situated between the point 29 and the point 27, shows the hue of the tube 11 when its temperature decreases between 37° C. (point 29) and 34° C. (point 27). This direction of temperature decrease is symbolized by the arrows which the portion 31 comprises. It can be seen that up to 34.2° C. the tube 11 maintains its colorless or practically colorless hue (second visual appearance) and that the hue of the tube 11 changes progressively from colorless or practically colorless (second visual appearance) to blue (first visual appearance) between 34.2° C. and 34° C.

The change in hue of the tube 11 is thus reversible, with a hysteresis (between the points 27 and 29) of 3° C.

The predetermined temperature threshold for the hue change is 37° C. in the direction of temperature increase and 34° C. in the direction of temperature decrease.

By virtue of this hue change, the material of the tube 11 of the straw 10 plays the role of a temperature indicator component.

The tube 11 enables the operator, when the straw 10 is filled, to visually check whether the dose of substance 21 contained in the straw 10 is above 37° C. in the direction of temperature increase and below 34° C. in the direction of temperature decrease.

For example, if the substance 21 is semen for artificial insemination which must be transferred to the animation at around 37° C., the tube 11 enables the operator to know that the temperature of the substance 21 is correct so long as the tube 11 is colorless or practically colorless.

Given the small wall thickness of the tube 11 of a straw 10 (here of the order of 170 μm), the temperature of the part of the tube 11 which surrounds the substance 21 matches that of the substance.

In practice, the substance 21 is heated by plunging the straw 10 into a water bath.

The fact that the whole of the tube 11 is of thermochromic material enables the temperature to be checked over the whole length of the tube 11.

If part of the dose of substance 21 contained in the tube 11 over part of its length is below 34° C. and another part of the dose of substance 21 contained in the tube 21 over another part of its length is above 37° C., for example because only part of the tube 11 has been plunged into the water bath, the difference in appearance of the tube 11 over the two parts concerned will enable the operator to know that this difference exists.

The reversible character of the hue change of the thermochromic material with which the tube 11 is formed enables monitoring of the temperature of the substance 21 contained in the straw. For example, if the substance has had the time to cool between the operation of warming in the water bath and the time at which the operator prepares to perform an artificial insemination, to the extent of being below 34° C., the appearance of the straw tube 11 will enable the operator to know that the substance 21 has thus cooled.

It is to be noted that it is advantageous, in the straw 10, that the role of the temperature indicator component be played by the material of the tube 11 rather than by a component added onto the material 11 of the tube such as a coating or a label.

This makes it possible to faithfully reflect the temperature of the substance 21 by virtue of the direct contact with the material of the tube 11 while avoiding the risks which such a direct contact could pose on account of friction between the stopper 12 and the tube 11 which occurs on manufacture (insertion of the stopper 12 into the tube 11) or at the time of expelling the dose of substance 21 (sliding the stopper 12 along a large portion of the length of the tube 11).

This also makes it possible to be able to manufacture the straw 10 much more simply and economically than if it had been necessary to add onto the inside surface of the tube 11, over its whole length, a separate temperature indicator component.

The manufacture of the tube 11 of the straw 10 is carried out here conventionally by extrusion of a plastic material apart from the fact that this plastic material (here PVC) comprises an additive to make it thermochromic with the aforementioned hue change.

Figure 6:
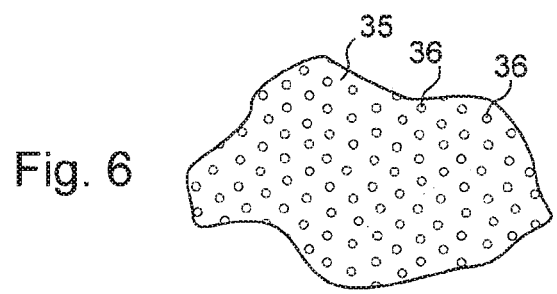
FIG. 6 is a diagrammatic view of a fragment of the thermochromic material of the straw tube.

FIG. 6 shows a fragment of the thermochromic material of the straw tube. This material has a base 35 of colorless or practically colorless PVC to which has been added an additive to make it thermochromic.

This additive is formed by generally spherical microcapsules 36. Each microcapsule 36 has a shell enclosing a thermochromic solution.

Here, the microcapsules 36 have an average diameter of approximately 5 to 10 micrometers. The dispersion of diameters linked to the manufacturing method of the microcapsules (interfacial polycondensation) means that the diameter of certain microcapsules attains up to 20 micrometers.

With such a size, the microcapsules 36 provide good resistance to pressure and temperature, enabling them to be compatible with the operations of hot extrusion serving to manufacture the tube 11.

It will be noted that the thickness of the wall of the tube 11 is of the order of 170 micrometers.

The shell of the microcapsules 36 is of polyurea.

The studies conducted by the applicant have shown that this material has the advantage of good compatibility with the base 35 of PVC and of being able to be colorless and transparent. This makes it possible to clearly see the thermochromic solution present in each microcapsule 36.

The best results for transparency were obtained with a polyurea resulting from the reaction of an aromatic polyisocyanate (better results than with an aliphatic polyisocyanate).

The studies conducted by the applicant have also shown that this material has the advantage of not influencing the viability of the spermatozoa present in the diluted semen preserved in a straw of which the tube comprises microcapsules of which the shell is of this material.

The microcapsules 36 are produced here by the known method of interfacial polycondensation.

Here, the components enabling the polyurea shell 36 of the microcapsules to be obtained are the following:
- TDI-based aromatic polyisocyanate (TDI standing for toluene diisocyanate) (proportion 86.5% by weight), of molecular formula $C_{19}H_{30}N_2O_8$, identified by the number CAS 53317-61-6;
- guanidine carbonate (proportion 8.6% by weight), of molecular formula $C_2H_7N_3O_3$, identified by the number CAS 593-85-1; and
- hydrazine hydrate (proportion 4.9% by weight), of molecular formula $H_2N-NH_2-H_2O$, identified by the number CAS 10217-52-4.

Here, the thermochromic solution enclosed by each microcapsule 36 is composed of:
- a solvent, here methyl stearate (proportion 92.8% by weight), of molecular formula $C_{19}H_{38}O_2$, identified by the number CAS 112-61-8;
- a proton donor (also referred to as a developer or active agent), here bisphenol A (proportion 4.8% by weight), of molecular formula $C_{15}H_{16}O_2$, identified by the number CAS 80-05-7; and
- a leuco dye, here CVL (Crystal Violet Lactone) (proportion 2.4% by weight), of molecular formula $C_{26}H_{29}N_3O_2$, identified by the number CAS 1552-42-7.

By virtue of these three compounds, so dosed by weight, the thermochromic solution turns from a blue hue to colorless or practically colorless for the above-mentioned temperature thresholds.

The studies conducted by the applicant have also shown that these components have the advantage of not influencing the viability of the spermatozoa present in the diluted semen preserved in a straw of which the tube comprises microcapsules containing this solution.

The use of methyl stearate as solvent gives the advantage of a certain degree of precision for the hue changes and relatively low hysteresis.

It will be noted that on manufacturing the tube 11, by hot extrusion, some of the microcapsules present in the initial material have their shell broken. Therefore, components of the shell and components of the thermochromic solution are to be found outside the microcapsules 36.

To obtain good resistance to pressure and to heat for the microcapsules (in order for at least a major proportion of the microcapsules with the additive remains after the extrusion operation giving the tube 11, in which the pressure attains 500 bars and the temperature 180° C. for 1 to 2 min), in addition to the size of the aforementioned micro-particles, the studies conducted by the applicant have shown that good results are obtained for this mechanical strength and for this heat resistance while maintaining the colorless or practically colorless character of the shell with a proportion of 25% by weight of shell for the microcapsules. Indeed, a good size for the thickness of the shell is obtained.

The studies conducted by the applicant have shown that good results are obtained for a proportion comprised between 20% and 30%, or even 40%.

It will be noted that it is possible to perform an analysis of the composition of the microcapsules 36 by dissolving the PVC base 35 of the material of the tube 11, for example with THF. The analysis is conducted for example by gas chromatography after vaporization.

Here, the additive formed by the microcapsules 36 is in a proportion of 2.5% by weight in the material of the tube 11.

The studies conducted by the applicant have shown that good results are obtained for a proportion comprised between 1.5% and 3.5%, or even 10%.

To give a smooth surface state of the tube 11 of the straw 10 at least on the inside, the initial material giving the tube 11 by hot extrusion contains a proportion of lubricant of melt type for example 1.5% by weight, that lubricant melting under the effect of heat, coming to the surface and therefore placing itself between the material in course of extrusion and the extrusion die.

The smooth surface state on the inside of the tube 11 makes it possible to provide good preservation of the liquid 21, in particular excellent viability of spermatozoa when the substance 21 is diluted animal semen, as well as fluid-tightness between the tube 11 and the stopper 12 at the time of its sliding to expel the dose of substance 21.

With the aid of FIGS. 7 and 8 a variant of the straw shown in FIGS. 1 to 4 will now be described.

In this variant of the straw 10, the sealing agent 20 is replaced by a different sealing agent. For the rest, the straw 10 illustrated in FIGS. 7 and 8 is identical to the straw 10 illustrated in FIGS. 1 to 4.

Figure 7:
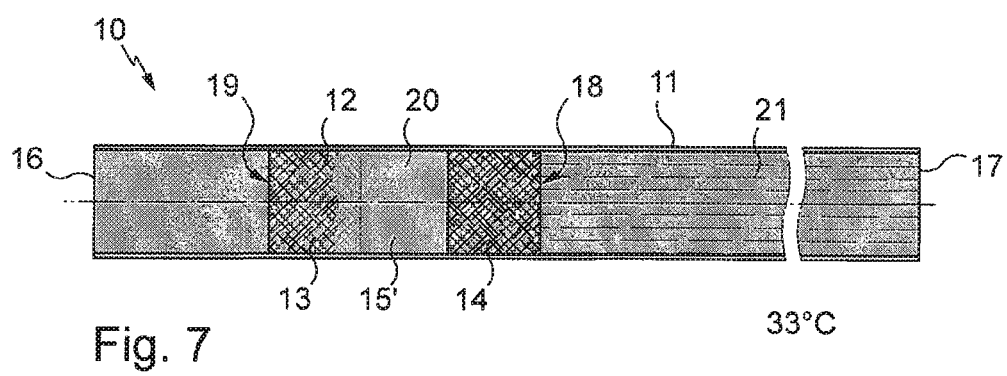
FIGS. 7 and 8 are similar views respectively to FIG. 2 and to FIG. 3 but for a variant of the straw in which the stopper comprises an indicator component having a first predetermined color in the absence of prior contact with the liquid-based substance and a second predetermined color, having a hue different from the hue of the first color, when it has been in contact with that substance.
Figure 8:
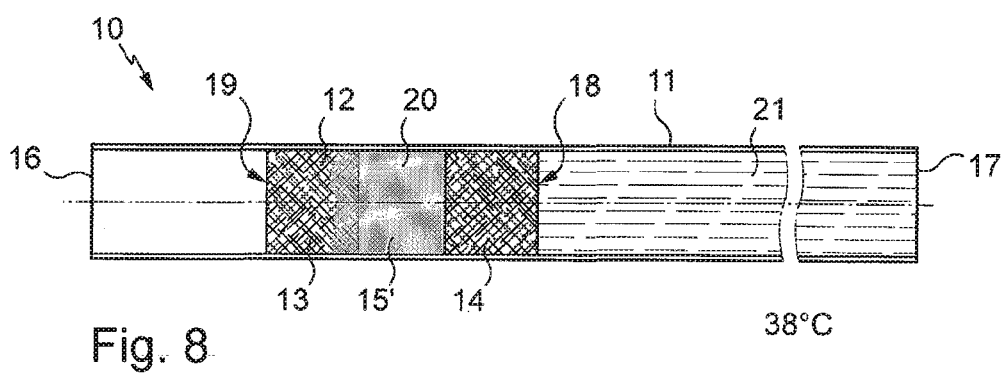

When it is empty (without the substance 21), the straw 10 illustrated in FIGS. 7 and 8 has an appearance similar to the straw 10 illustrated in FIGS. 1 to 4.

On comparing FIGS. 1 and 4 with FIGS. 7 and 8, it will be noted that the stopper 12 has a different appearance when the straw 10 is in the empty state (FIGS. 1 and 4) and the filled state (FIGS. 7 and 8).

When the straw 10 is in the empty state, the sealing agent 20 (powder 15) of the stopper 12 is of a first color and when the straw 10 is in the filled state, the sealing agent 20 (gel 15') is of a second color.

Here, the hue of the first color (empty state) is brownish white while the hue of the second color (filled state) is greenish yellow.

For example, the powder 15, as seen through tube 11 in the colorless or practically colorless state (FIG. 4), is of Pantone® 155U color and the gel 15', as seen through the tube 11 in the colorless or practically colorless state (FIG. 8), is of Pantone® 395C color.

It is recalled here that the hue of a color corresponds to the wavelengths (or to the single wavelength in the case of a color of the rainbow) of the light emitted by the object having this color. The hue is only one of the components of the color, which depends on other parameters such as luminosity and saturation.

The change in hue between the powder 15 and the gel 15' is due to the presence, in the sealing agent 20, of a product changing hue between the dry state and the state dissolved in water.

Here, the product changing color is the sodium salt of fluorescein.

It will be noted that the fluorescein sodium salt is not spermicidal and therefore is suitable for contact with animal semen.

It is known that the fluorescein sodium salt has the following formula:

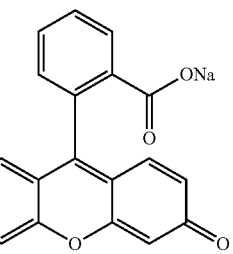

and that it is identified by the number CAS 518-47-8.

It is also known that the fluorescein sodium salt is a fluorophore salt i.e. capable of emitting fluorescent light when it is dissolved in water; while in the dry state it is a non-fluorophore salt.

When the sealing agent 20 of the stopper 12 is in the dry state (powder 15) the fluorescein sodium salt does not emit fluorescent light since it is in the dry state. When the sealing agent 20 of the stopper 12 is in the dampened state (gel 15'), the fluorescein sodium salt is dissolved in the water contained in the gel 15' and then emits fluorescent light.

The change in hue of the sealing agent 20 is due to the addition of fluorescent light.

By virtue of the presence of the fluorescein sodium salt, the sealing agent 20 forms an indicator component indicating contact between the stopper 12 and the substance 21: the sealing agent 20 is of a predetermined color in the absence of prior contact with the substance 21 and a second predetermined color, having a different hue to the hue of the first color, when the sealing agent has been in contact with the substance 21.

It will be observed, as illustrated in FIGS. 7 and 8, that in the dampened state of the stopper 12, part of the plug 13 has taken on the same hue as the gel 15'.

As a matter of fact, on filling the straw, between the moment when the substance 21 reached the powder 15 and the moment when the powder 15 transformed into a liquid-tight gel 15', a small quantity of powder 15 dissolved by the substance 21 but not yet gelled was absorbed by the plug 13.

The indicator component indicating contact with the substance 21, formed by the sealing agent 20, is useful for checking the proper filling of the straw 10, and more precisely the proper dampening of the stopper 12 by the substance 21.

It is known that it is very important, for the proper preservation of the substance 21 contained in the straw 10, that the stopper 12 be correctly dampened. As a matter of fact, in a case in which the straw 10 is not welded at its ends, or welded only at the end 17 furthest from the stopper 12, the fluid-tightness of the straw 10 is ensured in part by the stopper 12.

On emptying the straw 10, the correct dampening of the stopper 12 on filling enables the stopper 12 to play its piston role without there being leaks between the tube 11 and the stopper 12.

Thanks to the transparent or translucent character of the tube 11, checking the proper filling of the straw can be carried out visually by the operator, simply by verifying that the sealing agent 20 of the stopper 12 has indeed adopted the hue of the second predetermined color, i.e. a greenish yellow hue in the present example.

The proper filling of the straw 10 can also be checked automatically.

In practice, as the filling is carried out at an ambient temperature less than 34° C., the blue hue (first appearance) of the tube 11 is taken into account for checking proper filling.

In the example illustrated of the stopper 12, the powder 15 comprises 1/1000 by weight of fluorescein sodium salt powder in the dry state.

A range suitable for the implementation of the invention is from 1/100 to 1/100000 by weight of fluorescein sodium salt powder in the dry state.

Advantageously, the range is from 1/500 to 1/50000, and still more advantageously from 1/1000 to 1/25000.

To obtain good homogeneity, the powder 15 is prepared by successive mixing operations.

In the illustrated example of the stopper 12, the powder 15 is exclusively formed by fluorescein sodium salt powder in the dry state and by powder of material that polymerizes on contact with water.

Here, the powder of material that polymerizes on contact with water is alginate.

In a variant of the sealing agent 20, the fluorescein sodium salt powder in the dry state is replaced by another product that is not a fluorophore in the dry state and is a fluorophore when it is dissolved in water, which is in the form of a salt in the dry state.

This is for example another fluorescein salt, a Rhodamine B salt, a Rhodamine 6G salt and/or a salt of Eriochrome® Cyanine R.

It is known that Rhodamine B has the following formula:

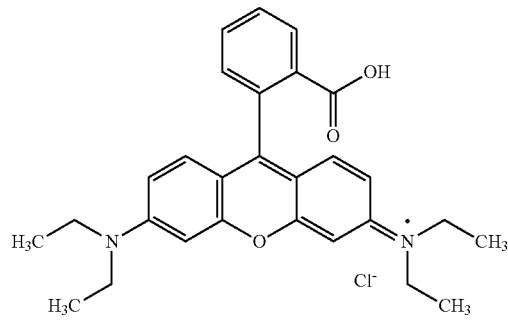

and that it is identified by CAS number 81-88-9.

It is known that Rhodamine 6G has the following formula:

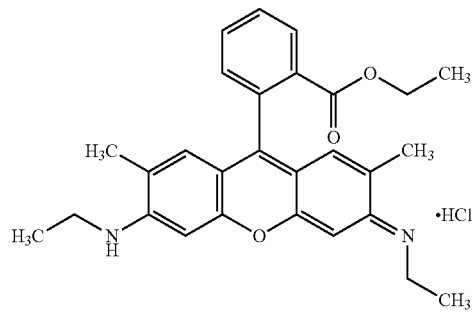 [SMILES: CC/N=c1\cc2oc3cc(NCC)c(C)cc3c(-c3ccccc3C(=O)OCC)c-2cc1C ; Cl]

and that it is identified by the number CAS 989-38-8.

It is known that Eriochrome® Cyanine R has the following formula:

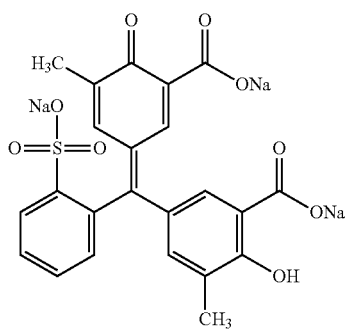

and that it is identified by the number CAS 64-18-9.

The fluorophore agent comprised by the sealing agent 20 in the dampened state (gel 15') may be formed by a mixture of fluorescein, Rhodamine 6G and Rhodamine B or by only one or by two of these products.

By selecting one or more of these products, the hue of the sealing agent 20 in the dampened state (gel 15') can be adjusted. Selecting the hue of the sealing agent 20 when it has been in contact with the substance enables the straw 10 to be recognized, visually or by analysis of the light spectrum emitted.

In variants not illustrated, the sealing agent 20 comprises, in addition to the fluorophore agent or agents, a coloring agent.

It is known that a coloring agent, contrary to a fluorophore agent, does not emit light comprising a peak having a crest of predetermined wavelength, but a relatively broad range of wavelengths of the same intensity.

The combination of the spectrum of a fluorophore agent and of a coloring agent may be useful for the quality of recognition of the origin of the straw.

The coloring agent, without being a fluorophore, is for example methylene blue or α-zurine.

Such coloring products, when in the dry state, for example in the form of a small proportion of the sealing agent 20 in the dry state (powder 15) do not affect or affect only a very little the color of the other products forming the sealing agent, for example the alginate powder. On the other hand, when the sealing agent is dampened, the coloring product communicates its coloration to the rest of the sealing agent, for example the gel 15'.

As a variant, the change in color of the sealing agent 20 is brought about on contact with a liquid other than water, for example a product contained in a diluent or a semen preservative for animal semen.

For more detail on the sealing agent 20 of the variant of the straw 10 illustrated in FIGS. 7 and 8, reference may be made to the French applications 3 011 731 and 3 011 732.

In a variant not illustrated, the base 35 of the material of the tube 11 is not colorless and transparent but colored and transparent, for example pink (the first appearance is a purple hue and the second appearance is a pink hue) or yellow (the first appearance is a green hue and the second appearance is a yellow hue).

In another variant not illustrated, the threshold for hue change is targeted on a value different from 37° C., for example 4° C. which corresponds to the temperature recommended in the step of equilibration of the straw, after filling and before freezing in liquid nitrogen, or else −120° C. which is the maximum temperature to ensure effective freezing; and/or the thermochromic material is designed to have several hue changes, for example targeted respectively on −120° C., on 4° C. and on 37° C.

As a variant, the target value of 37° C. is replaced by a target value of 35° C. The thresholds for change in visual appearance are then 35° C. in the direction of temperature increase and 32° C. in the direction of temperature decrease.

In variants not illustrated, the base of the material of the tube such as 11 is different from PVC, for example Surlyn®; the composition of the shell of the microcapsules is different, for example a polyurea resulting from the reaction of other components or a polyurethane for example resulting from the reaction of an aromatic polyisocyanate; and/or the composition of the thermochromic solution is different, for example with a leuco dye different from CVL in order to have a hue other than blue in the state other than colorless or practically colorless.

Numerous other variants are possible according to circumstances, and in this connection it is to be noted that the invention is not limited to the examples described and shown.

The invention claimed is:

1. A straw for the preservation of a predetermined dose of liquid-based substance, comprising a tube extending between a first end and a second end and comprising a liquid-tight, gas-permeable stopper, which stopper being disposed in the tube dose to its first end and extending between a first end turned towards the first end of the tube and a second end turned towards the second end of the tube, said stopper and said tube being configured so that after the liquid-based substance has come to meet the stopper by its second end, the stopper blocks the passage of the liquid-based substance and, by pushing on its first end, can be slid in the tube towards the second end of the tube, wherein said tube is of thermochromic material having a reversible change in hue at a predetermined temperature threshold, whereby the tube has a first visual appearance if its temperature is below said predetermined threshold and a second visual appearance different from the first visual appearance if its temperature is above said predetermined threshold, and wherein the tube is transparent or translucent when it has the first appearance and when it has the second appearance, the stopper being visible through the tube, said tube having a small wall thickness configured such that the temperature of the part of the tube that surrounds the liquid-based substance matches that of the liquid-based substance.

2. A straw according to claim 1, characterized in that the tube has an inside surface having a smooth surface state.

3. A straw according to claim 1, characterized in that said predetermined threshold is 35° C. to 37° C. in the direction of temperature increase.

4. A straw according to claim 1, characterized in that said predetermined threshold is 32° C. to 34° C. in the direction of temperature reduction.

5. A straw according to claim 1, characterized in that the tube has a blue hue in the first appearance and is colorless in the second appearance.

6. A straw according to claim 1, characterized in that the material of the tube comprises microcapsules having a shell enclosing a thermochromic solution.

7. A straw according to claim 6, characterized in that said shell of the microcapsules is of polyurea or polyurethane.

8. A straw according to claim 7, characterized in that said shell of the microcapsules results from the reaction of an aromatic polyisocyanate.

9. A straw according to claim 6, characterized in that said thermochromic solution comprises methyl stearate as solvent.

10. A straw according to claim 6, characterized in that in said microcapsules the proportion by weight of the shell is comprised between 20% and 40%.

11. A straw according to claim 6, characterized in that the proportion by weight of said microcapsules in the material of the tube is comprised between 1.5% and 10%.

12. A straw according to claim 6, characterized in that the material of the tube comprises a PVC base.

13. A straw according to claim 1, characterized in that said stopper is formed by two plugs made from a fibrous substance enclosing a sealing agent formed by a powder transforming on contact with said substance into an impermeable paste or gel adhering to the wall of the tube so that the stopper is liquid-tight, said powder comprising the powder of a salt that is not a fluorophore in the dry state and is a fluorophore when it is dissolved in water.

14. A straw according to claim 6, characterized in that in said microcapsules the proportion by weight of the shell is 25%.

15. A straw according to claim 6, characterized in that the proportion by weight of said microcapsules in the material of the tube is 2.5%.

* * * * *